Patented May 8, 1923.

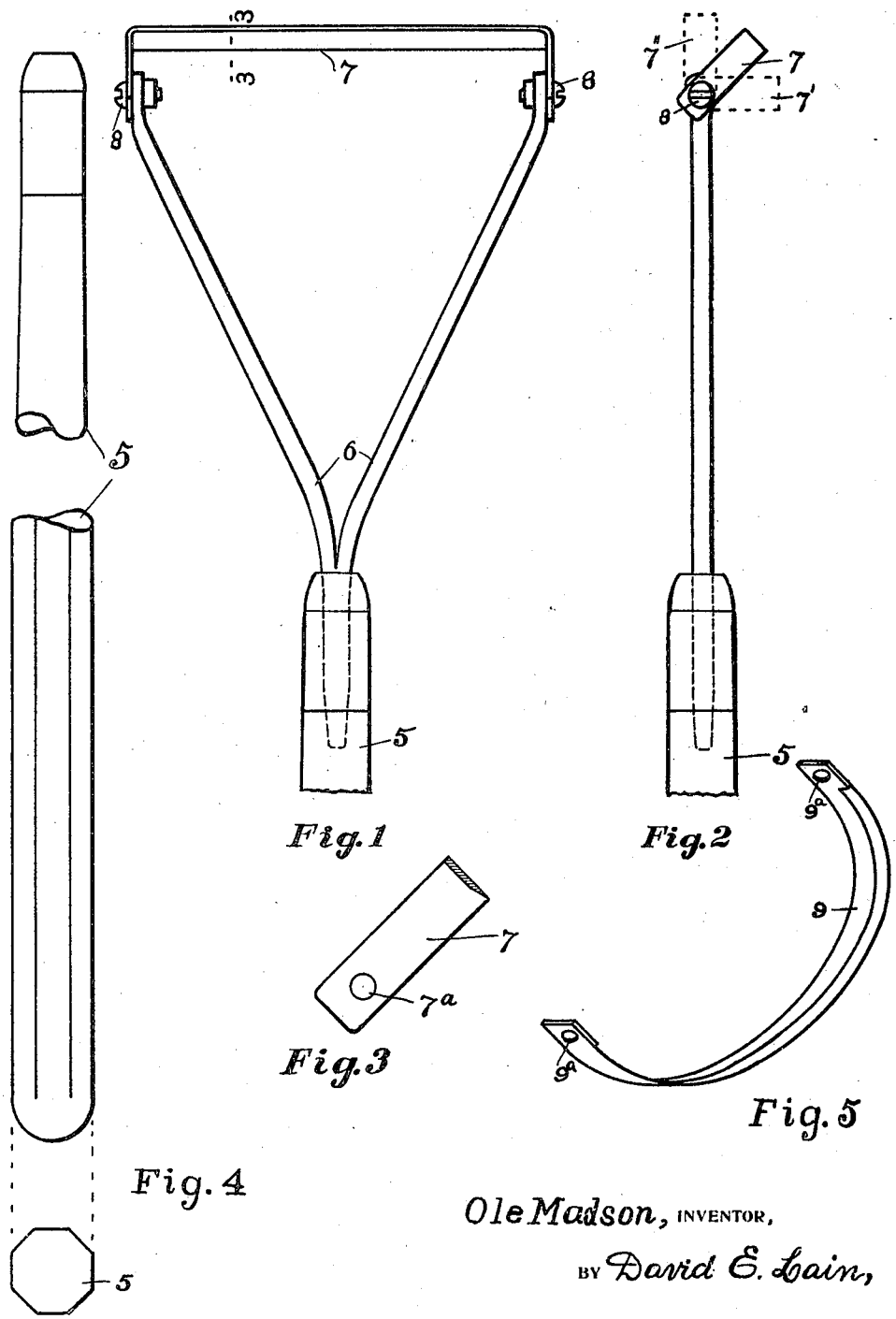

1,454,326

UNITED STATES PATENT OFFICE.

OLE MADSON, OF FERNDALE TOWNSHIP, WHATCOM COUNTY, WASHINGTON.

GARDEN WEEDER.

Application filed September 7, 1920. Serial No. 408,546.

*To all whom it may concern:*

Be it known that I, OLE MADSON, a citizen of the United States, residing in the township of Ferndale, in the county of Whatcom and State of Washington, have invented a new and useful Garden Weeder, of which the following is a specification.

My invention relates to improvements in garden weeders, and the object of my invention is to provide a garden weeder which is of light and durable construction and has a long thin blade which may readily be set at varying angles with the weeder's handle.

I attain this object with the device illustrated in the accompanying sheet of drawing in which Figure 1 is a plan view of my weeder, Fig. 2 is a side elevation of the same, Fig. 3 is a sectional view on the line 3—3 Fig. 1 drawn on a larger scale, Fig. 4 is a plan view and end elevation of the weeder handle, and Fig. 5 is a perspective view of another form of blade.

Similar characters refer to similar parts throughout. Certain parts are broken away for lack of space.

More particularly, 5 is the weeder handle. Preferably it is of octagonal cross section to aid the hand in firmly grasping it when one end only of the blade is being used.

6 is the bifurcated handle shank. It is fastened in the handle and has flattened ends, each of which is provided with a hole, and said holes are in a line at right angles to said weeder handle. The weeder blade is shown at 7. It is made from a long, thin and narrow strap of steel the ends of which have been bent over on the same side of the blade at right angles therewith. Each of said ends has a hole therethrough. Only one edge of said blade is sharpened. The blade thus prepared is adapted for bolting to the shank with bolts and nuts 8, 8. When thus connected, and said nuts loose, it can be set at the desired angle with the handle and then firmly clamped in the desired position by tightening said nuts. And 9 is another form of blade especially adapted for cutting out runners of strawberry plants.

In practice I have found the adjustable feature of the blade very serviceable. For ordinary work between rows the full-line blade position shown at 7 in Fig. 2 is most used. Between hills the blade position at 7″ is serviceable. And when the ground is soft and only shallow cutting is desired the position at 7′ is used.

The most successful use of my weeder requires that the operative walk backwards while passing the weeder blade backward and forward always keeping the same beneath the soil.

Having thus fully disclosed my invention what I claim is new and desire to secure by Letters Patent is,—

In a garden weeder in combination, a handle, a bifurcated shank fastened in said handle, said shank having a hole through each of its bifurcated ends in line with each other, a thin narrow cutting blade having one, only, sharpened edge and having short upturned ends with a hole in each end in line with each other pivotally and clampably mounted on said shank with bolts through said holes whereby said blade may be adjusted to a desired position of rotation around said bolts and clamped in said position.

OLE MADSON.